United States Patent [19]

Anson-Smith

[11] Patent Number: 4,757,631

[45] Date of Patent: Jul. 19, 1988

[54] FISH LURE

[76] Inventor: Brian Anson-Smith, 50 Trevelyan Street, Botany, New South Wales, Australia

[21] Appl. No.: 98,486

[22] Filed: Sep. 18, 1987

[30] Foreign Application Priority Data

Oct. 9, 1986 [AU] Australia .............. PH8406

[51] Int. Cl.⁴ .................................. A01K 85/00
[52] U.S. Cl. ..................... 43/17.5; 43/42.33
[58] Field of Search ........... 43/42.33, 42.06, 17.5, 43/57

[56] References Cited

U.S. PATENT DOCUMENTS

| | | | |
|---|---|---|---|
| 2,737,750 | 3/1956 | Pierce | 43/42.33 |
| 2,753,650 | 7/1956 | Rentz et al. | 43/42.33 |
| 3,031,792 | 5/1962 | Swenson | 43/42.33 |
| 3,540,144 | 11/1970 | Gurka | 43/42.33 |
| 3,579,893 | 5/1971 | Wolfe | 43/42.33 |
| 3,913,256 | 10/1975 | Morris et al. | |
| 4,190,976 | 3/1980 | Hurt | |
| 4,475,301 | 10/1984 | Wortham | 43/17.5 |
| 4,658,532 | 4/1987 | McFarland et al. | 43/17.5 |

Primary Examiner—Nicholas P. Godici
Assistant Examiner—Karen Skillman
Attorney, Agent, or Firm—Dellett, Smith-Hill and Bedell

[57] ABSTRACT

A fish lure has a bouyant casing containing a pump and a battery mounted inside a watertight compartment providing positive bouyancy to the casing. A spray nozzle is mounted on top of the casing and is driven by the pump. The prepulsive force of its discharge causes rotation of the casing about a vertical axis. The underside of the casing is open and leads into a water chamber which fills with water quickly when the lure is placed in the water, to provide it with a self-righting capability. The outside of the immersed portion of the casing is of frusto-conical shape and has horizontally-spaced upright reflectors attached to it. As the casing rotates, the reflectors produce an occulting effect under water which appears to attract deep-swimming fish to it. A light may also be provided on the casing for night fishing.

9 Claims, 2 Drawing Sheets

FISH LURE

FIELD OF THE INVENTION

This invention relates to a fish lure usable during the day or night and in either sea or fresh water.

STATE OF THE ART

Many techniques are used to entice fish towards a fishing boat. Both amateur and professional fisherman make use of burley, which is a bag of oily fish pieces hung over the side of the boat to attract predatory fish. At night, commercial fishing boats also sometimes use powerful lights which direct their beams onto the surface of the water or are suspended under the boat. A further technique used by commercial fishing boats is to play a spray of water from a hose onto the surface alongside the boat.

All of the above techniques are to some extend successful in attracting fish if the weather, ambient light and sea conditions are suitable. However the cost of powerful lighting and continuously-running hose pumps, together with the noise and awkwardness in handling such equipment restricts their use to commercial fishing boats.

OBJECT OF THE INVENTION

An object of this invention is to provide a fish lure suited for use by amateur or professional fishermen.

THE INVENTION

A fish lure, in accordance with the present invention, comprises a self-righting float formed by a hollow casing containing a pump and having multi-faceted, reflective side surfaces on the submerged portion of the casing for producing an occulting effect under water from ambient light incident on them when the float turns, and a spray nozzle on top of the casing and operated by the pump to produce a spray of water droplets on the water surface alongside the float.

In accordance with a narrower aspect of the invention a fish lure is formed as a float provided by hollow casing having upper and lower portions arranged respectively above and below the casing's water line, the upper casing portion being provided with a spray nozzle for producing a spray of water droplets on the water surface alongside the float, and the lower portion of the casing having a set of horizontally-spaced, spaced, vertical reflectors arranged around its outside surface to produce an occulting effect under water from ambient light incident on them when the float turns about a vertical axis, the casing containing a water chamber having openings enabling it to fill with water to give the casing self-righting properties when the lure is cast into the water and to drain rapidly when the casing is lifted out of the water, a watertight battery compartment and a pump being located in the chamber the pump being connected to be powered by the battery and to deliver water under pressure to the spray nozzle.

PREFERRED FEATURES OF THE INVENTION

Preferably the faceted undersurface of the float is formed by a ring of spaced reflectors. The incident ambient light—which may be sunlight, moonlight, starlight or daylight—is reflected downwards by the side-surfaces and appears to flash when viewed from a position beneath the float, as a result of it turning. Conveniently the underside of the float is formed as a downwardly convergent frusto-cone having strip reflectors attached to it. The angle the surface of the cone makes with the upright axis of the float is suitably between 10° and 30°.

Preferably the float carries its own power source, conveniently a battery mounted in a watertight compartment in the float. It is preferably re-chargeable. The battery may also be used to power a light on the top of the float to indicate its position at night. The float may be tethered to the fishing boat, or left to float freely.

Although the effectiveness of the float in attracting fish is obtained without providing powerful light sources, there may be circumstances in which it is practical to produce the light flashes underwater electrically from the float, either by using lights in place of reflectors, or in addition to reflectors.

The preferred design of casing comprises a plastics moulding having within its upper portion, a watertight compartment accessible through a lid on the top of the float. The compartment may house the battery and a removable electrical circuit board above the battery. The pump may be mounted on a bracket speaced beneath the compartment. Sufficient air is trapped inside the compartment to ensure bouyancy of the float. An opening in its underside allows water to enter and submerge the pump. Air holes provided in the upper endportion of the float allow air to escape from between the compartment and the outside wall of the float as the float is lowered into the water. A solid body of foamed plastics may be incorporated into the float to ensure it remains bouyant even if the watertight integrity of the compartment is lost and it fills with water.

Although trials conducted in sea and fresh water have demonstrated the effectiveness of the lure, the features of the float to which the effectiveness is attributable and the extent to which that effectiveness depends on them has not yet been ascertained. Also it is not known whether the physical size of the float is important, although it is intended that the float should be made in a range of different sizes. Finally, it is also not known whether larger fish are attracted directly to the float itself, or to shoaling smaller fish which may collect around the float. Indeed the noise of the pump driving the water spary may also play a part in attracting the fish. Possibly, the flashing effect obtained by the reflectors resembles the flashing which occurs from the silvery sides of pelagic fish when they are feeding and turning rapidly.

Tests so far performed have used a float about sixty centimetres high and fifty centimetres wide. This, of course, is quite incapable of being cast into the water by a fishing rod and the term "fish lure" as used in this specification is not to be confused with the small lure used by rod fisherman and which is attached to the fishing line between the fish-hook and the rod and is cast into the water with the baited hook.

INTRODUCTION TO THE DRAWINGS

The invention will now be described in more detail, by way of example, with reference to the accompanying drawings, in which:

DESCRIPTION OF PREFERRED EMBODIMENT

Figure 1:
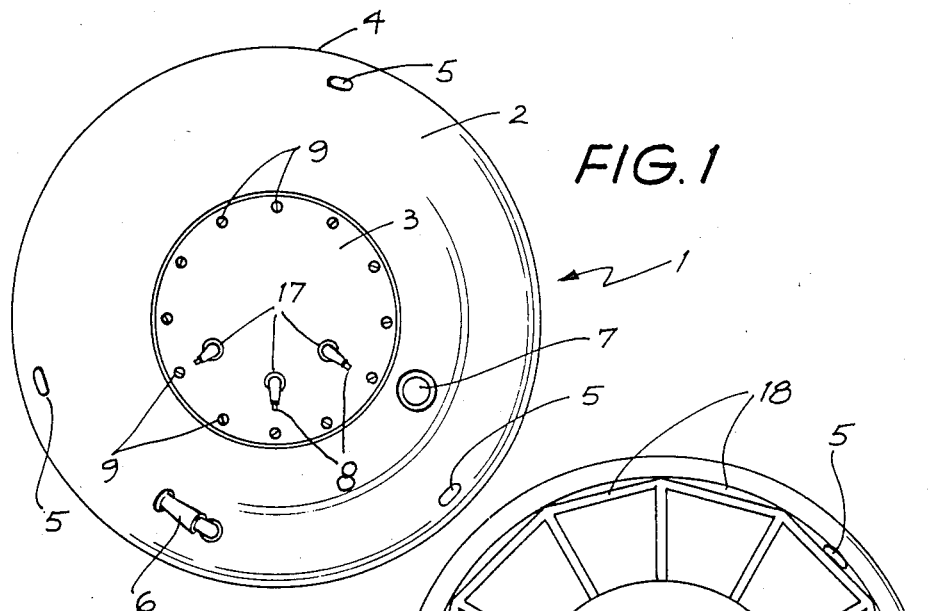
FIG. 1 is a plan view of a lure.

FIG. 1 shows a fish lure provided with a self-righting casing 1 havng its upper portion located above its water line, formed by a circular cap 2 with a central opening closed by a domed lid 3. The outer margin of the cap is formed as a thick bead 4 having three openings 5 for attaching a tethering lead (not shown) to the lure. A hose nozzle 6 is mounted on the bead and points tangentially and upwardly away from the cap 2 to provide a spray of water droplets alongside the lure and, by its direction, turning the lure in the water about its upright axis.

A switchable lamp 7 is mounted on the cap 2 so that, at night, the position of the lure is always known.

The domed lid 3 has three rebates 17 containing respective electrical terminals 8 and is held in position by a ring of bolts 9.

Figure 2:
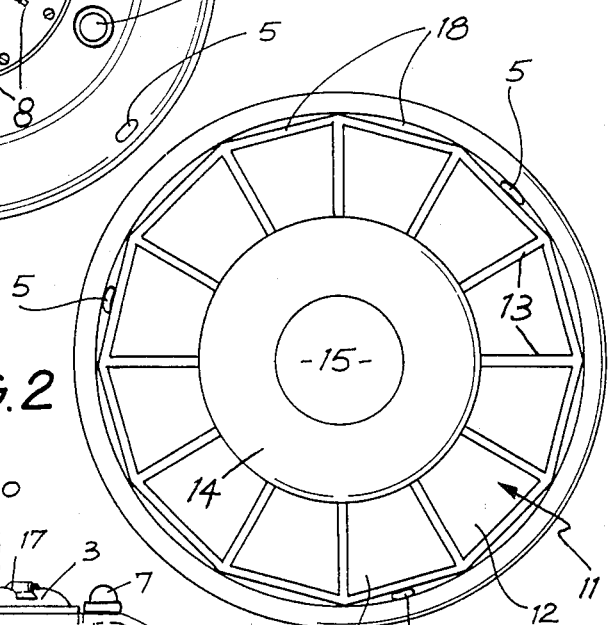
FIG. 2 is an underview of the lure.
Figure 3:
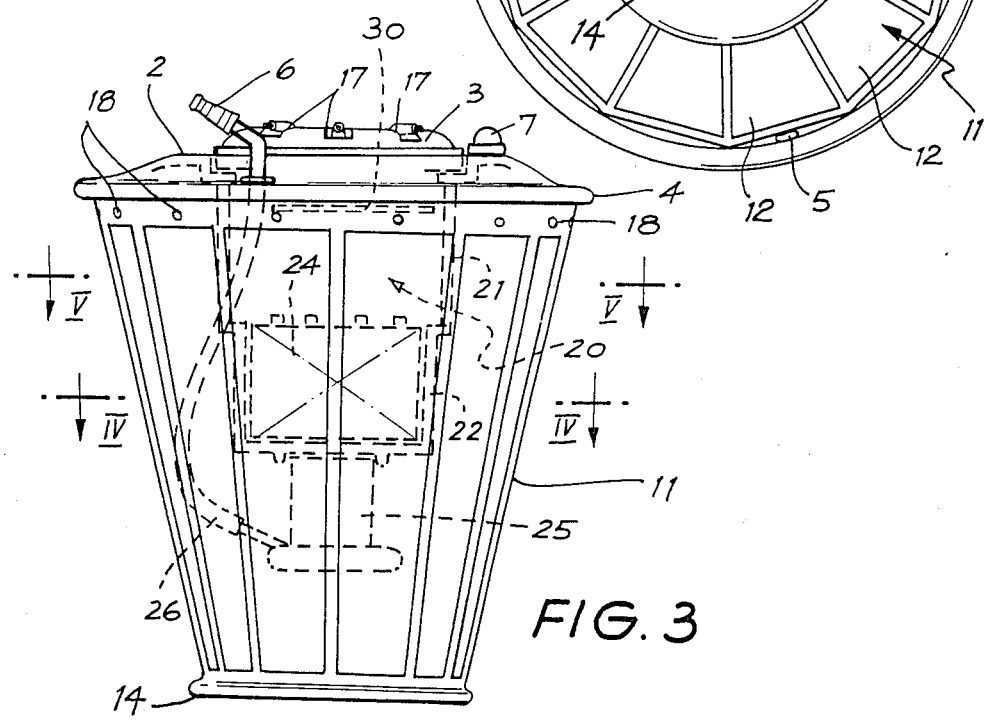
FIG. 3 shows the lure in elevation.

The lower portion of the casing 1 beneath the cap 2 is formed as a frusto-cone 11 shaped as shown in FIGS. 2 and 3. The frusto-cone is formed with twelve reflecting flats 12 separated by upright ribs 13 and its axial length is almost fifty centimeters. It tapers from an upper diameter of about fifty centimeters to a lower diameter of about twenty centimeters. At its lower end the float has an annular base 14 defining a central opening 15 through which water enters the float when it is lowered into the water. Holes 18 are provided at the upper ends of the flats 12 to allow air to expel from the float's interior as the water enters it. The interior of the casing 1 thus provides a water chamber which fills quickly with water when the float as cast lowered into the water to give the casing 1 self-righting properties, and which empties rapidly when the float is lifted from the water by its upper portion, so that the considerable weight of water-filling the chamber does not have to be lifted also.

Figure 4:
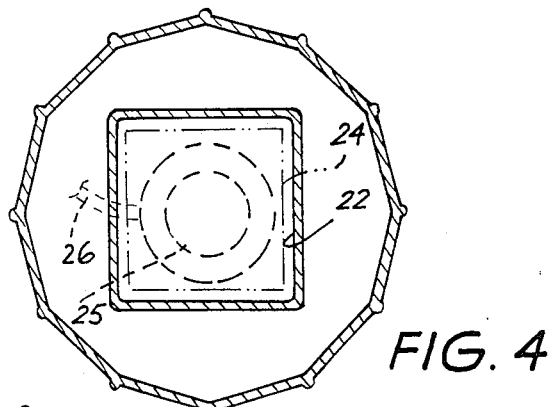
FIGS. 4 and 5 are respectively cross-sections through the lure taken respectively on the lines and in the directions indicated by the arrows IV—IV, and V—V.
Figure 5:
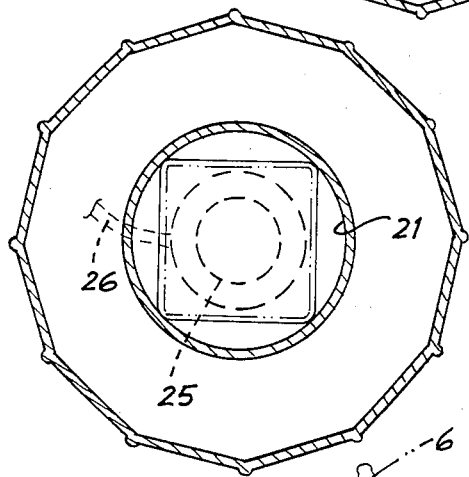

As shown in FIGS. 3, 4 and 5, the lid 3 closes the top of a watertight compartment 20 arranged in the upper portion of the casing 1. The compartment has an upright cylindrical upper portion 21 and a lower portion 22 of square cross-section closed at its lower end. The lower portion 22 contains a rechargeable battery 24 for powering a pump 25 mounted on a bracket spaced beneath the underside of the compartment so as to be totally immersed in the water inside the chamber when floating in the water. A hose 26 extends from the pump 25 to the underside of the nozzle 6. Sufficient air is trapped inside the compartment to give the float positive bouyancy so that it floats with the bead 4 just above the level of the water.

A circuit board 30 is mounted in the upper portion 21 of the compartment and controls operation of the pump 25 and the light 7. Power leads (not shown) extend from the underside of the lid 3 to the battery 24 to enable it to be recharged without having a remove the lid from the float portion of the lure.

Figure 6:
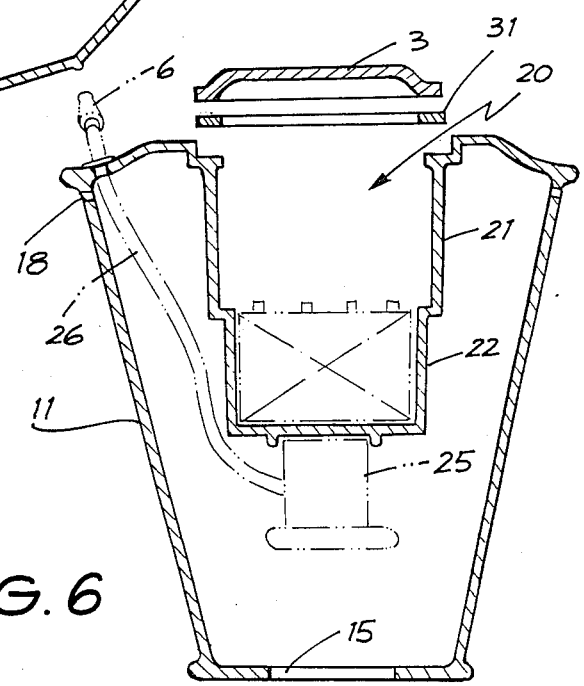
FIG. 6 is a vertical section through the lure with parts removed and showing a lid and a sealing grummet 5 displaced from the top of the lure.

As shown in FIG. 6, a watertight grummet 31 is located beneath the lid 3. The compartment 20 is integrally moulded with the float part of the lure from plastics material such as hardened PVC so that the casing is of robust construction.

The twelve flats 12 have respective reflective, plastics strips adhering to them.

OPERATION OF THE PREFERRED EMBODIMENT

The lure is used by being lowered, tapered end downwards, over the side of the boat. As the lure descends into the water, displaced air is expelled through the ring of holes 18 until the water level in the float rises to the level of the holes. The lure is then bouyant as sufficient air to ensure bouyancy is trapped in the compartment 20. If it is to be used at night the lamp 7 is switched on. If the lure is to be tethered, a thin rope is attached to one of the bead openings 5. However it is preferred to allow the lure to be anchored or moored. It can, of course, also be allowed to float free. A switch (not shown) on the lid 3 of the float allows the motor to be started when it is judged the water level inside the float has reached the level of the pump. A float-operated switch may also be used for this purpose, to start the pump automatically.

When the lure is in use, its conical portion rocks from side-to-side with wave motion. The operation of the pump causes the nozzle 6 to direct a spray of water droplets onto the water in the vicinity of the float and the orientation of the nozzle, which may be varied as desired and then locked in a chosen position, causes the float to turn about its vertical axis. Such turning occurs even if the float is tethered, as the float then turns in one direction until stopped by the tether, and then turns in the other direction as the tether tends to unwind.

As the lure swings and turns, the individual reflective surfaces of the flats 12 cause incident ambient light from above to be reflected down beneath the float. When viewed from a position at a deeper level, the turning of the float produces an occulting effect. This may, in practice, resemble the flashes of light produced by the silvery flanks of pelagic fish when shoaling together and feeding. The water droplets sprayed in the surface of this water may add to this effect and cause large predatory fish to approach the lure. Baited lines in the vicinity of the float can then be used to catch the fish.

MODIFICATIONS OF THE PREFERRED EMBODIMENT

Although in the example of the invention just described, the lamp is mounted on the bead 4, it is preferred to mount it on the lid 3. In place of the adhesive strips on the flats 12, reflecting mirrors can be used instead and screwed into position. Also, instead of being moulded from plastics, the float may be constructed from other materials such as metal, fibreglass, or a foamed plastics material. It can also have a different shape from that illustrated in the drawings.

In a further variation, a holder is incorporated into the float for holding a charge of fish oil which is progressively released into the water to attract fish towards the float.

If it is required to ensure positive bouyancy of the float should the battery compartment inadvertently fill with water, this may be achieved by providing inside the upper region of the chamber a ring of bouyant foamed plastics material to provide supplementary bouyancy.

I claim:

1. A fish lure comprising: a self-righting float, a hollow casing forming the outside wall of said float upper and lower portions to said casing being respectively arranged above and below a waterline to said float, said casing defining internally a chamber and being formed with openings leading into the upper and lower regions of said chamber a pump located in said chamber, multifaceted reflective side surfaces formed externally on the lower portion of said casing, a spray nozzle on the upper portion of said casing, and connections delivering water from said pump to said nozzle.

2. A lure as set forth in claim 1, in which said submerged portion of said casing is of downwardly-tapering frusto-conical shape open at its underside to define an entry for water to enter said chamber and leave said chamber quickly, and a set of horizontally-spaced vertical reflectors provided on the outside of the lower portion of the casing.

3. A lure as set forth in claim 2, including within said chamber a watertight battery compartment, and electrical power cnnections extending through said compartment from the battery within it to the pump mounted in the chamber beneath it.

4. A lure as set forth in claim 3, in which the volume of the battery compartment is sufficient to provide positive bouyancy to the float, an electrical circuit board is mounted above the battery in the compartment, electrical terminals provided on the outside of the top of the casing, and electrical leads extending between the terminals, the circuit board and the battery.

5. A lure as set forth in claim 4, in which the casing and the battery compartment are molded integrally from rigid polyvinyl chloride plastics material and access to the compartment is by way of a removable lid provided in the top of the casing.

6. A lure as set forth in claim 5, in which the nozzle is mounted eccentrically with respect to the upright axis of the float and is orientated in a direction which rotates the float from the propulsive force of the water discharged from the nozzle.

7. A fish lure comprising a float, a hollow casing providing said float, upper and lower portions to said casing being respectively arranged above and below a waterline to said float, a water spray nozzle on the upper portion of said casing, a set of horizontally-spaced vertical reflectors arranged around the outside of the lower portion of said casing, a water chamber defined internally of said casing which is formed with openings leading from the outside of said float into said chamber and arranged in the upper and lower regions of said lower portion of the casing, a watertight battery compartment and a pump located in said chamber, power connections extending from a battery in said compartment to said pump, and water delivery connections extending from said pump to said nozzle.

8. A lure as set forth in claim 7, in which said lower portion of the casing is of downwardly-tapering frusto-conical shape and has an open underside providing one of the openings leading into the chamber, the other openings comprising holes extending radially arranged around the upper part of the lower portion of the casing.

9. A lure as set forth in claim 8, in which the internal volume of the battery compartment is sufficient to accommodate sufficient air in addition to the battery to give the float positive bouyancy characteristics and the chamber in the lower portion of the casing fills with water to provide the float with self-righting characteristics when cast into the water.

* * * * *